United States Patent
Davidson et al.

(10) Patent No.: US 7,864,943 B2
(45) Date of Patent: Jan. 4, 2011

(54) METHODS AND SYSTEMS FOR LOAD SHARING AND PRESERVING SEQUENCING OF SIGNALING CONNECTION CONTROL PART (SCCP) MESSAGES

(75) Inventors: Mark Ernest Davidson, Chapel Hill, NC (US); Devesh Agarwal, Raleigh, NC (US); Raghavendra Gopala Rao, Cary, NC (US)

(73) Assignee: Tekelec, Morrisville, NC (US)

( * ) Notice: Subject to any disclaimer, the term of this patent is extended or adjusted under 35 U.S.C. 154(b) by 1335 days.

(21) Appl. No.: 10/922,593

(22) Filed: Aug. 20, 2004

(65) Prior Publication Data

US 2006/0039546 A1 Feb. 23, 2006

(51) Int. Cl.
*H04M 7/00* (2006.01)
(52) U.S. Cl. .................... 379/229; 379/219; 379/221.1; 370/235; 370/236; 370/352
(58) Field of Classification Search ................ 379/229, 379/219, 221.1; 370/235, 236, 352
See application file for complete search history.

(56) References Cited

U.S. PATENT DOCUMENTS

| | | | |
|---|---|---|---|
| 5,550,914 A * | 8/1996 | Clarke et al. ................. | 379/230 |
| 5,740,234 A | 4/1998 | Black et al. | |
| 6,018,515 A | 1/2000 | Sorber | |
| 6,119,000 A * | 9/2000 | Stephenson et al. ....... | 455/432.1 |
| 6,628,672 B1 | 9/2003 | Cabello | |
| 6,795,546 B2 | 9/2004 | Delaney et al. | |
| 6,839,336 B2 | 1/2005 | Tiedemann, Jr. et al. | |
| 7,046,692 B1 * | 5/2006 | Gradischnig ................ | 370/467 |
| 2002/0054674 A1 | 5/2002 | Chang et al. | |
| 2003/0202491 A1 | 10/2003 | Tiedemann, Jr. et al. | |
| 2004/0004956 A1 * | 1/2004 | Gilmour et al. ............. | 370/352 |
| 2004/0096049 A1 | 5/2004 | Delaney et al. | |
| 2004/0264674 A1 | 12/2004 | Delaney et al. | |
| 2005/0013427 A1 * | 1/2005 | Breiholz et al. ............. | 379/229 |

(Continued)

FOREIGN PATENT DOCUMENTS

WO 00/67491 11/2000

(Continued)

OTHER PUBLICATIONS

Notification of Transmittal of the International Search Report and the Written Opinion of the International Searching Authority, or the Declaration in International Application No. PCT/US05/29670 (Feb. 7, 2006).

(Continued)

*Primary Examiner*—Ahmad F Matar
*Assistant Examiner*—Khai N Nguyen
(74) *Attorney, Agent, or Firm*—Jenkins, Wilson, Taylor & Hunt, P.A.

(57) ABSTRACT

Methods and systems for load sharing and preserving sequencing of signaling connection control part (SCCP) messages are disclosed. According to one method, SCCP messages are received at an inbound interface module and assigned a sequence number. Each SCCP message is then transmitted using a load sharing algorithm to any one of a plurality of SCCP modules for SCCP processing. After the SCCP processing, the SCCP messages are returned to the inbound interface module and ordered based on the assigned sequence numbers the messages are then transmitted in order to an outbound interface module.

34 Claims, 4 Drawing Sheets

U.S. PATENT DOCUMENTS

2005/0152278 A1* 7/2005 Schantz ..................... 370/252

FOREIGN PATENT DOCUMENTS

| WO | WO 00/67491 | * | 11/2000 |
| WO | WO 02/13545 | | 2/2002 |
| WO | WO 2007/030257 A2 | | 3/2007 |

OTHER PUBLICATIONS

Official Action for U.S. Appl. No. 11/218,290, May 5, 2010.

Notification of Transmittal of the International Search Report and the Written Opinion of the International Searchig Authority, or the Declaration for International Application No. PCT/US06/31168 (Apr. 25, 2007).

"Signalling System No. 7—ISDN User Part Functional Description," ITU-T, Q.762 (Dec. 1999).

"Signalling System No. 7—ISDN User Part Functional Description," ITU-T, Q.761 (Dec. 1999).

Tekelec, "Eagle® Feature Guide," PN/9110-1225-01, (Jan. 1998).

Russell, "Signaling System #7: Sequence Numbering," Chapter 5, pp. 170-171 (Copyright 2000).

Comer, "Internetworking with TCP/IP vol. I: Principles, Protocols, and Architecture: 13.22 Initial Sequence Numbers," p. 217 (Copyright 1995).

* cited by examiner

METHODS AND SYSTEMS FOR LOAD SHARING AND PRESERVING SEQUENCING OF SIGNALING CONNECTION CONTROL PART (SCCP) MESSAGES

TECHNICAL FIELD

The subject matter disclosed herein relates generally to the distribution and processing of messages in a communications network. More particularly, the subject matter disclosed herein relates to methods and systems for load sharing and preserving sequencing of signaling connection control part (SCCP) messages.

BACKGROUND ART

In SS7 signaling networks, signaling connection control part (SCCP) is used by applications to access databases and other services. In particular, SCCP is used by the mobile application part (MAP) and the transaction capabilities application part (TCAP), as well as other level four protocols to communicate application level information. SCCP service is divided into five classes. The classes are class 0, which provides basic connectionless service, class 1, which provides sequenced connectionless service, class 2, which provides basic connection oriented service, class 3, which provides flow controlled connected oriented service, and class 4, which provides error recovery and flow controlled connection oriented service. Currently, classes 2, 3, and 4 are not used in telecommunications networks. Both class 0 and class 1 are used. Class 0 services provide for the basic transport of TCAP and other application layer messages when sequencing is not required. Class 1 is used to provide sequenced service whenever more than one SCCP message exists for a transaction.

SCCP processing can be performed at any node in a signaling network. Typically, SCCP routing functions, such as global title translation, are performed at signal transfer points (STPs). Performing SCCP routing at STPs allows service switching points to send messages to the STPs where the messages are global title translated and routed to their intended destinations. Because SCCP routing can be a processor-intensive application, it may be desirable to employ a distributed internal processing architecture to process SCCP messages. In such an architecture, a plurality of identically provisioned SCCP modules may process received SCCP messages. SCCP messages arriving at the STP may be load shared among the SCCP processing modules. Load sharing SCCP messages among SCCP processing modules decreases the processing load on individual modules and increases the throughput of the STP. However, load sharing cannot be performed for class 1 SCCP messages, which require sequencing, because load sharing such messages can result in the messages being transmitted out of order from the STP.

FIG. 1 illustrates misordering of SCCP messages by an STP with a distributed internal processing architecture. Referring to FIG. 1, STP 100 includes a plurality of link interface modules 102, a plurality of SCCP modules 104, and a counter-rotating, dual-ring bus 106. Link interface modules 102 interface with SS7 signaling links. SCCP modules 104 perform SCCP routing functions, such as global title translation.

In the illustrated example, SCCP messages 108, 110, and 112 are assumed to be class 1 SCCP messages relating to the same transaction. Accordingly, SCCP messages 108, 110, and 112 arrive at LIM 102. LIM 102 executes a load sharing algorithm that distributes the messages among SCCP modules 104 for processing. In the illustrated example, messages 108, 110, and 112 are assumed to arrive over high-speed links (e.g., SS7 over IP or ATM links) and are distributed to different SCCP modules. Due to different processing loads on SCCP modules 104, SCCP messages 108, 110, and 112 may be processed with different delays. For example, SCCP message 112 may be processed before SCCP message 110. Accordingly, SCCP message 112 may exit STP 102 before SCCP message 110. Because the SCCP class 1 messages are misordered, a processing error will occur at the destination node since there is no mechanism provided by SCCP for reordering the messages. Because of this problem with conventional load sharing algorithms, load sharing has not been performed for class 1 SCCP messages that requiring sequencing.

Accordingly, there exists a long felt need for methods and systems for processing sequenced SCCP messages in a manner that allows load sharing and that preserves message sequencing.

SUMMARY

Methods and systems are disclosed herein for preserving sequencing of SCCP messages in a load sharing environment. According to the method, SCCP messages are received at a LIM of an STP and assigned a sequence number. Each SCCP message is then transmitted to any one of a plurality of SCCP modules for SCCP processing. After SCCP processing, the SCCP messages may be returned to the originating LIM, queued, and ordered based on the assigned sequence numbers. Upon arrival in the queue, each message may be assigned a timestamp. The originating LIM checks the sequence number of the message at the head of the queue. If the sequence number is the next expected sequence number, the message is transmitted to the outbound LIM. If the sequence number is not the next expected sequence number, transmission may be delayed for a predetermined time period. If the correctly-sequenced message arrives before the time period expires, it is placed at the head of the queue and transmitted. If the correctly-sequenced message does not arrive before the time period expires, the message at the head of the queue may be transmitted to prevent head of queue blocking. Thus, by assigning sequence numbers and using a timer, the present invention allows class 1 SCCP messages to be load shared while preserving message sequencing and preventing head of queue blocking.

Accordingly, it is an object of the invention to perform load sharing of class 1 SCCP messages in a manner that preserves message sequencing.

It is another object of the invention to provide an SCCP processing node with a distributed internal architecture capable of efficiently processing SCCP messages.

Some of the objects of the invention having been stated hereinabove, and which are addressed in whole or in part by the subject matter disclosed herein, other objects will become evident as the description proceeds when taken in connection with the accompanying drawings as best described hereinbelow.

BRIEF DESCRIPTION OF THE DRAWINGS

Exemplary embodiments of the subject matter will now be explained with reference to the accompanying drawings, of which.

DETAILED DESCRIPTION

According to one embodiment, the subject matter described herein includes a communications network routing node, such as an STP, configured to load share and preserve sequencing of class 1 SCCP messages. The systems described herein can comprise a collection of modules and functions. It is understood that these modules and functions may be implemented in software residing in memory and executed by one or more general-purpose microprocessors. Alternatively, the modules and functions described herein may be implemented in hardware, such as application-specific integrated circuits (ASICs) or firmware, such as programmable logic modules. Any combination of hardware, software, and/or firmware for load sharing and preserving sequencing of class 1 SCCP messages is intended to be within the scope of the invention.

Figure 1:
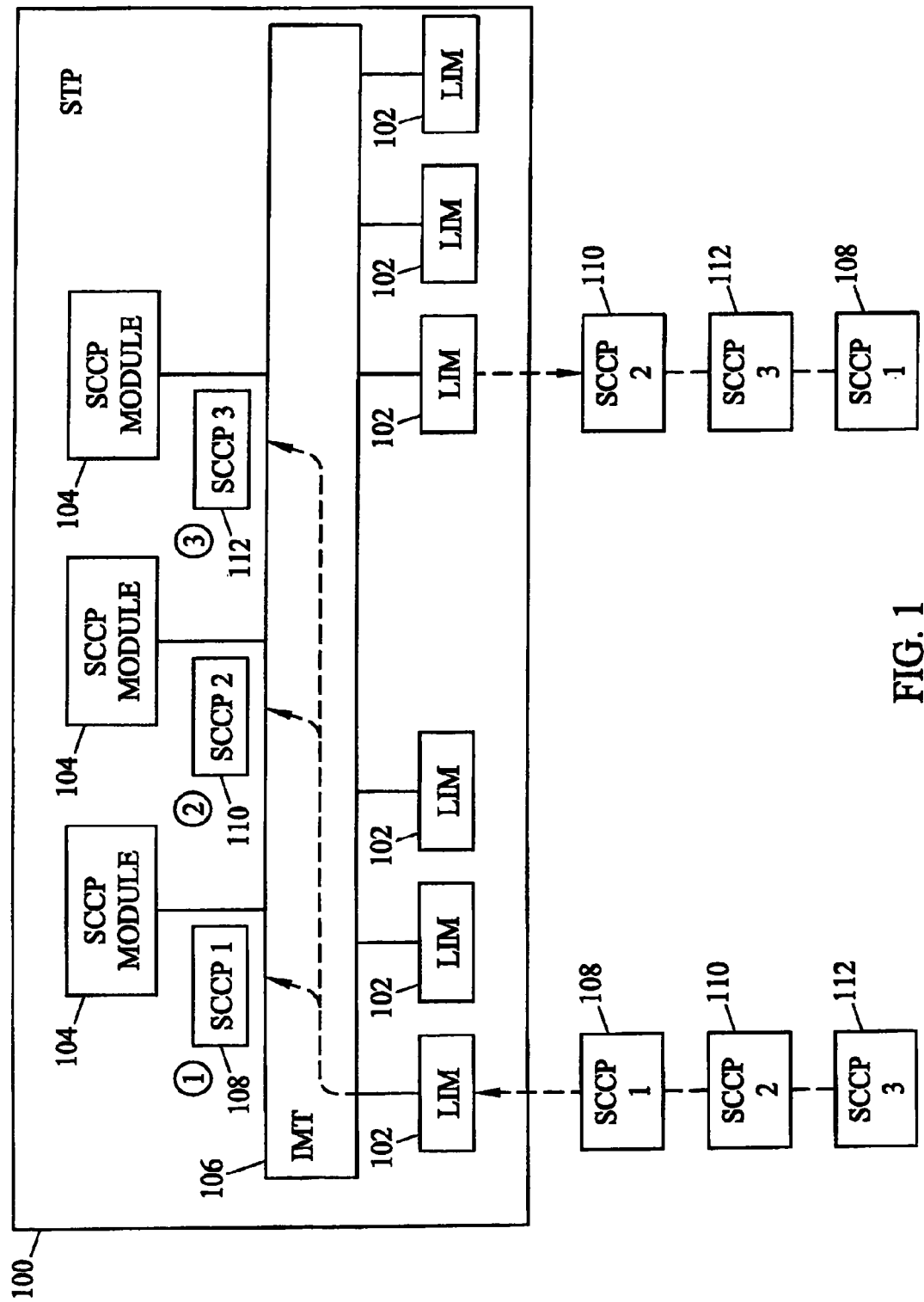
FIG. 1 is a block diagram of an exemplary SS7 signal transfer point (STP) node that performs signaling connection control part (SCCP) processing on SCCP messages.
Figure 2:
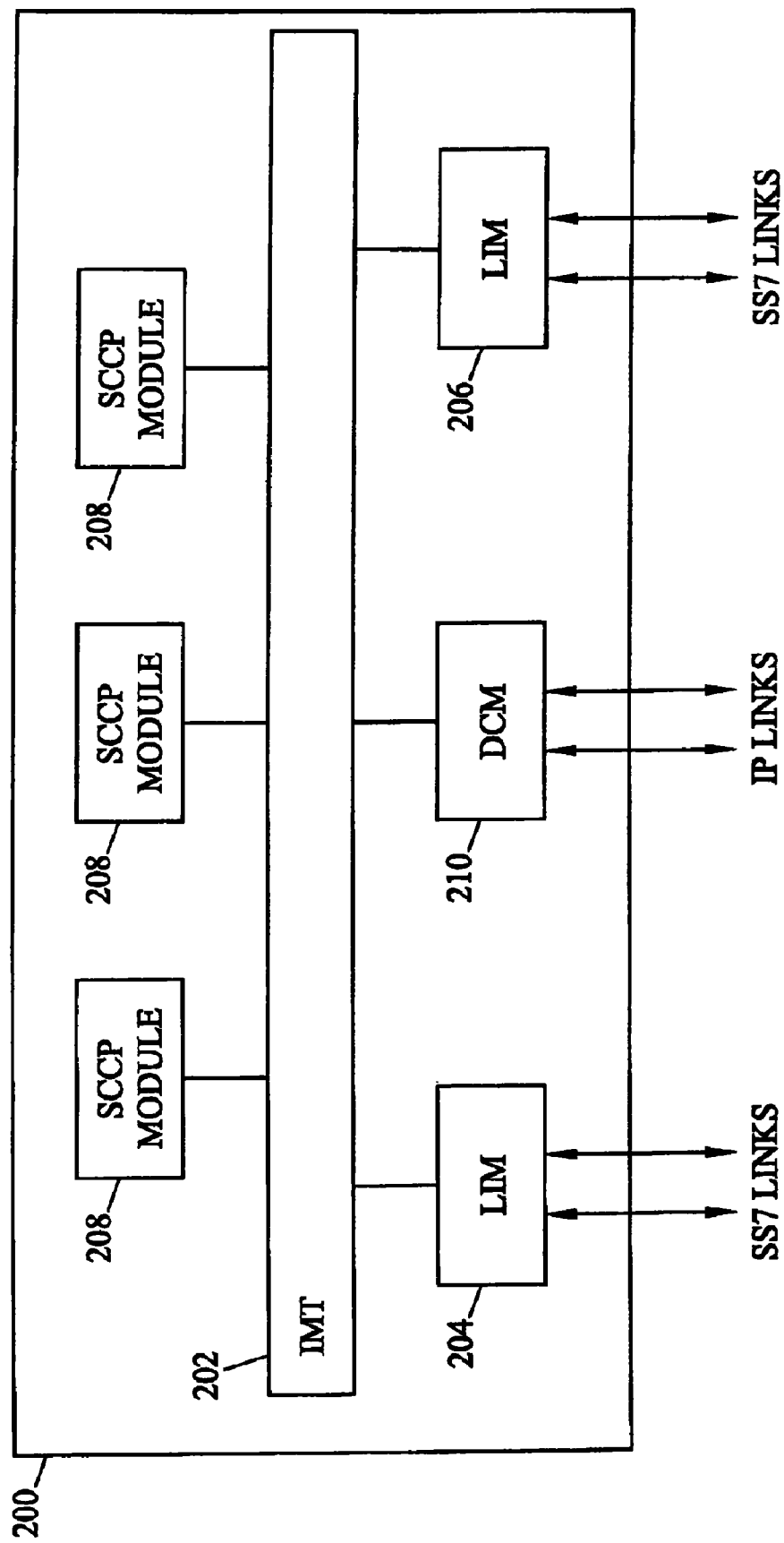
FIG. 2 is a block diagram illustrating an exemplary internal architecture of an STP node for load sharing and preserving sequencing of class 1 SCCP messages according to an embodiment of the present invention.

FIG. 2 illustrates an exemplary internal architecture of an STP node 200 for load sharing and preserving sequencing of class 1 SCCP messages according to one embodiment of the present invention. Referring to FIG. 2, node 200 can include a high-speed communications bus 202, referred to herein as the interprocessor message transport (IMT) bus. A number of distributed processing modules or cards can be coupled to IMT bus 202, including: a first SS7-capable link interface module (LIM) 204, a second SS7-capable LIM 206, a plurality of signaling connection control part (SCCP) modules 208 and a data communications module (DCM) 210. LIMs 204 and 206 send and receive messages over SS7 signaling links, as described above. In addition, LIMs 204 and 206 may assign sequence numbers to class 1 SCCP messages to ensure proper ordering of messages for outbound transmission. An exemplary mechanism for assigning sequence numbers and ordering SCCP messages for outbound transmission will be described in detail below. SCCP modules 208 perform SCCP processing functions, such as global title translation. Data communication module 210 includes functionality for sending and receiving SS7 messages over IP signaling links. In addition, data communications module 210 may also sequence and load share SCCP messages in the same manner as LIMs 204 and 206.

For simplicity of illustration, only a single LIM 204 described herein as receiving SCCP messages for STP 200. In addition, for illustration, only a single LIM 206 is described herein as transmitting from STP 200. However, the distributed processing architecture of STP 200 may include multiple LIMs, SCCP modules, DCMs, and other processing modules without departing from the scope of the invention.

Exemplary LIMs suitable for use with the subject matter disclosed herein include two-port LIMs, eight-port LIMs, and twenty-four-port ATM LIMs. Two-port LIMs are capable of handling two 56 kbps SS7 signaling links. Eight-port LIMs are capable of handling eight 56 kbps SS7 signaling links. Twenty-four-port ATM LIMs are capable of processing 24 SS7 over ATM signaling links.

Exemplary hardware suitable for implementing LIMs, DCMs, and SCCP modules may be similar to hardware used for LIMs, DCMs, and database service modules (DSMS) available from Tekelec, Inc., of Calabasas, Calif. (hereinafter, "Tekelec") in the EAGLE® STP or the IP[7] SECURE GATEWAY™ products. A LIM card, a DCM card, or a DSM card may contain functionality in addition to that described herein. The description herein focuses on LIM, DCM, and SCCP module functionality associated with the processing of SCCP signaling messages. Briefly, such hardware can include a printed circuit board with an application processor, a communications processor, and a dual-port memory mounted thereon. The application processor runs application software associated with each card type. For example, the application software executed by the application processor on the LIM may include SS7 message routing software, SCCP message load sharing software, SCCP sequencing software, and SCCP queuing software. The application software executed by the application processor on a DSM or SCCP module may include SCCP processing software and class 1 SCCP message distribution software that returns a class 1 SCCP message to the originating LIM. Application software on a DCM may include SS7 adaptation layer software for sending and receiving SS7 messages over IP, SCCP sequencing software, and SCCP queuing software. The communications processor on each card sends and receives messages over bus 202.

Figure 3:
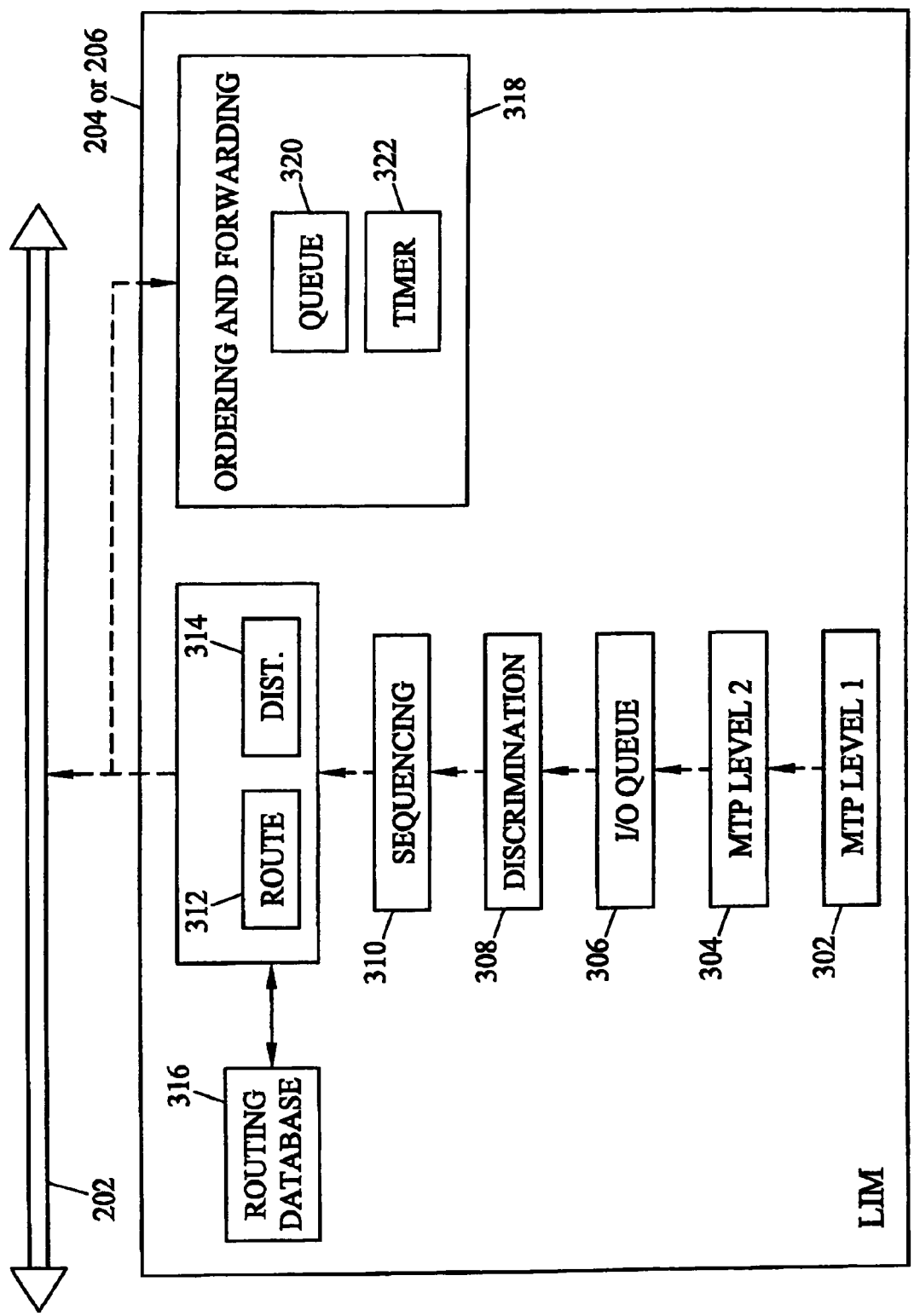
FIG. 3 is an exemplary internal architecture for a link interface module (LIM) for load sharing and preserving sequencing of class 1 SCCP message according to an embodiment of the present invention.

FIG. 3 illustrates an exemplary internal architecture for a LIM 204 or 206 according to an embodiment of the present invention. Referring to FIG. 3, LIM 204 or 206 can include an MTP level 1 function 302, an MTP level 2 function 304, an I/O buffer 306, an SS7 MTP level 3 handling and discrimination (HMDC) function 308, a message sequencing function 310, a message routing function 312, a message handling and distribution function 314, a routing information database 316, and an ordering and forwarding function 318. MTP level 1 function 302 may send and receive digital data over a particular physical interface. MTP level 2 function 304 may provide error detection, error correction, and sequenced delivery of SS7 message packets. I/O buffer 306 may provide temporary buffering of incoming and outgoing signaling message packets.

HMDC function 308 may receive an incoming signaling message from the lower processing layers and determine whether the message is addressed to and consequently requires processing by one or more application subsystems in an STP (such as STP node 200) including LIMs 204 and 206. Sequencing function 310 receives signaling messages from the lower processing layers, identifies class 1 SCCP messages, and assigns a sequence number time to each of the class 1 SCCP messages. Once a sequence number has been assigned, sequencing function 310 forwards the message to distribution function 314. Distribution function 314 applies a load sharing algorithm to distribute the class 1 SCCP message to any one of a plurality of identically provisioned SCCP modules, such as SCCP modules 208. Any suitable load sharing method may be utilized. One exemplary load sharing algorithm suitable for use with embodiments of the present invention is referred to as the ticket voucher system, described in commonly-assigned, co-pending U.S. patent application Ser. No. 09/633,970, the disclosure of which is incorporated herein by reference in its entirety. Briefly, this method includes queuing messages at the inbound interface module. The inbound interface module then issues a ticket voucher request and sends the requests over the IMT bus. The destination address in the request message is that of the message originator. Because the IMT bus is of a ring design, the message will be eventually returned to the message originator. The ticket voucher request includes an identifier that specifies the type of cards to which the request is addressed. According to the present implementation, the type may be set to identify SCCP modules or cards. Each SCCP module may maintain available grants based on processing capacity. If a receiving SCCP module does not have available processing capacity, the receiving SCCP module may forward the request message to the next SCCP module. If the receiving SCCP module has available processing capacity, the receiving SCCP module will mark the request as granted. When the request message returns to the originating LIM, the originating LIM may dequeue its SCCP message and send the message to the SCCP module that issued the grant.

The present invention is not limited to using a request/grant system in order to perform load sharing. Alternate load sharing methods that may be used include round-robin distribution or any other suitable load sharing algorithm. For messages that do not require internal processing by STP 200, discrimination function 308 may forward these messages to routing function 312. Routing function 312 may route the messages to the LIM associated with the outbound signaling link using routing data stored in routing database 316.

Once distribution function 314 forwards a class 1 SCCP message to an SCCP module, the SCCP module may receive the message and perform the SCCP function. The SCCP module may then identify the message as a class 1 SCCP message that requires sequencing and return the message to the originating LIM. Ordering and forwarding function 318 on the originating LIM stores SCCP class 1 messages in a queue 320 according to their sequence numbers. Ordering and forwarding function 318 may also assign a timestamp to each class 1 SCCP message when the message is placed in the queue. If the message at the head of the queue has the next expected sequence number, ordering and forwarding function 318 may forward the message to the outbound LIM associated with the signaling link to which the message should be routed. If the message at the head of the queue does not have the next expected sequence number, ordering and forwarding function 318 may delay transmission of the message. Timer function 322 may send the message, even if the sequence number is not the next expected sequence number, after a predetermined time period in order to prevent blocking of the queue. Timer function 322 may calculate the time that the message at the head of the queue has spent in the queue by subtracting the message's timestamp from the current time. If the time that the message has been in the queue longer than the predetermined time period, timer function 322 may send the message to its destination to prevent blocking of the queue. Thus, by adding sequence numbers to class 1 SCCP messages that arrive at STP 200, sequencing is preserved, even though messages may be misordered because of different delays in SCCP processing.

Figure 4:
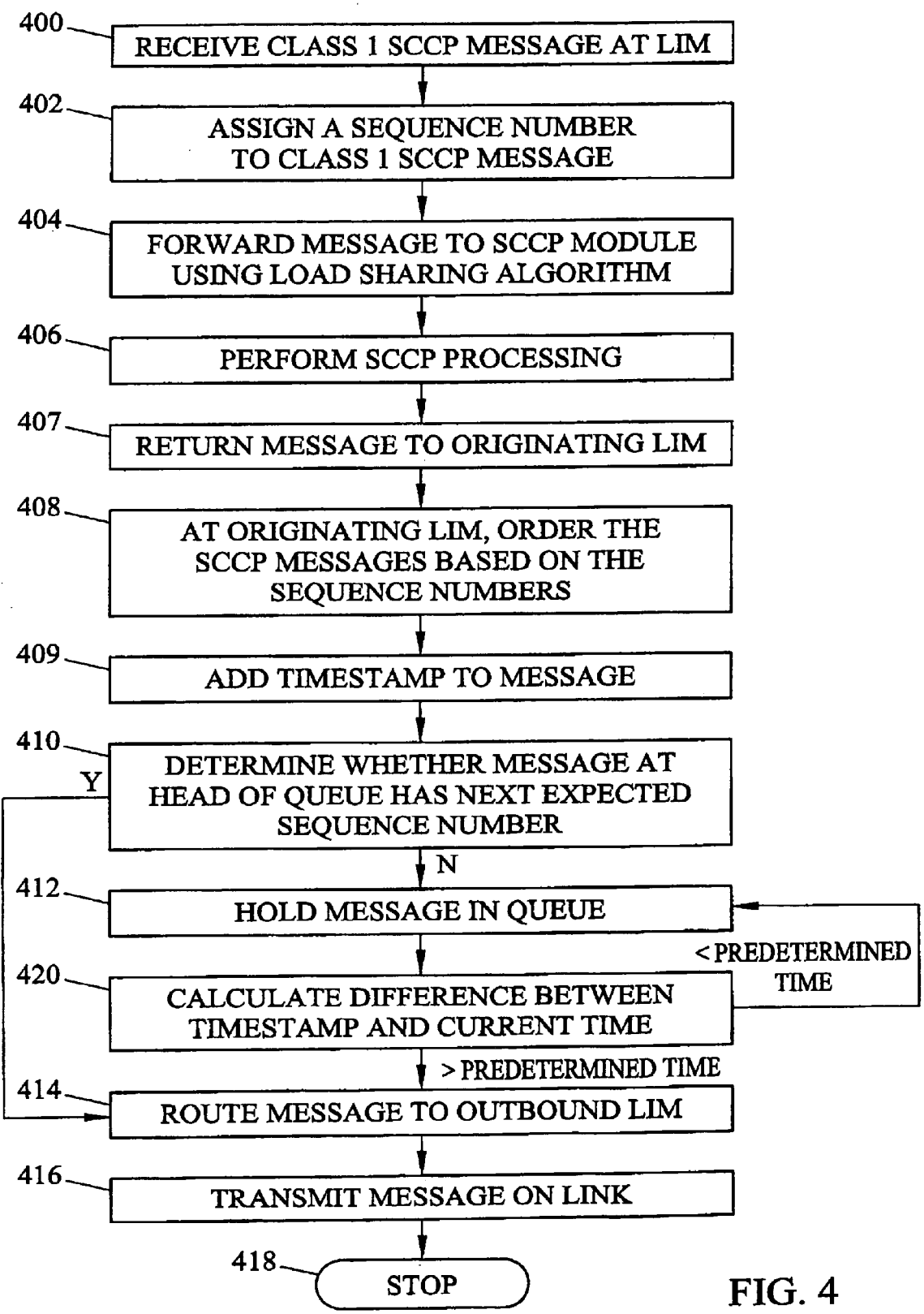
FIG. 4 is a flow chart illustrating exemplary steps that may be performed by a LIM for load sharing and preserving sequencing of class 1 SCCP messages received at an STP node according to an embodiment of the present invention.

FIG. 4 is a flow chart illustrating exemplary steps that may be performed by STP 200 for sequencing of class 1 SCCP messages according to an embodiment of the present invention. Referring to step 400 of FIG. 4, a message can be received at LIM 204 or 206 and passed up the stack to sequencing function 310. In this example, the received message is assumed to be a class 1 SCCP message. Other received messages may bypass sequencing function 310. At step 402, sequencing function 310 may assign a sequence number and timestamp to the class 1 SCCP message. The sequence number can be appended to the SCCP message. In one implementation, the sequence number can be 16 bits in length and wrap every 65,536. In addition, LIM 204 or 206 may include a counter for assigning sequence numbers in the order that the SCCP messages arrive. Sequence numbers may be assigned on a per link basis.

Referring to step 404 of FIG. 4, each SCCP message can be forwarded from LIM 204 or 206 to one of the SCCP modules using a load sharing algorithm. It is not necessary that the receiving LIM send the entire SCCP message to the SCCP modules. In one implementation, the receiving LIM may send a portion of the message, such as the global title address to be translated. In an alternate implementation, the inbound LIM may send the entire message to the SCCP module. The receiving SCCP module may perform SCCP message processing, such as global title translation (GTT) (step 406). In step 407, the SCCP module returns the message to the originating LIM.

At step 408, ordering and forwarding function 318 on the originating LIM can order and place the SCCP messages in queue 320 based on the sequence number. In step 409, ordering and forwarding function 318 assigns a timestamp to each class 1 SCCP message based on its time of arrival in queue 320. The SCCP messages can be held in queue 320 to await transmission to an outbound LIM in the ordered sequence. At step 410, sequencing function 318 determines whether the message at the head of the queue has the next expected sequence number. The next expected sequence number may be one less than the last sequence number previously sent. If the message does not have the next expected sequence number, control proceeds to step 412 where the message is held in the queue. If the message has the next expected sequence number, control proceeds to step 414 where the message is routed to the LIM associated with the outbound signaling link. In step 416, the message is transmitted over the link, and in step 420, processing for the received class 1 SCCP message ends.

Returning to step 412, if the message at the head of the queue does not have the next expected sequence number, control proceeds to step 420 where the timestamp in the message is checked. More particularly, a difference between the current time and the timestamp is calculated. If the difference is greater than a predetermined time period control proceeds to steps 414-418 where the message is routed to the outbound LIM and transmitted. The predetermined time period is preferably set to be greater than the processing delay that an SCCP message experiences from the time it is transmitted from the inbound LIM, processed by the SCCP module and returned to the inbound LIM. If the predetermined time period is set too low, messages may be transmitted out of sequence because the timer will always expire. If the predetermined time period is set too high, excessive queuing and processing delay may occur at the outbound LIM with messages waiting to be transmitted. In one exemplary STP implementation, the predetermined time period was set to 25 milliseconds.

If the time that an SCCP message has been in the queue is not greater than the predetermined time period, control returns to step 412 where the message is held in the queue. Holding the message allows time for re-ordering of SCCP messages that are returned to the originating LIM out of order. Providing a timer that transmits messages that have been in the queue for a predetermined time period prevents a message from blocking transmission of other messages when an SCCP message in a transaction is lost or has not been transmitted.

If an SCCP message is transmitted because it has the next expected sequence number, the next expected sequence number maintained by sequencing function 318 may be incremented by one. If an SCCP message is transmitted due to expiration of the timer, the next expected sequence number may be set to one more than the sequence number of the message. Advancing the next expected sequence number when a timer operation occurs and a message is transmitted prevents out-of-sequence messages that are transmitted due to expiration of the timer from causing loss of synchronization between the next expected sequence number counter and the sequence numbers in the queue that are waiting to be transmitted. For example, two SCCP messages may arrive at an inbound LIM and be assigned sequence numbers 1 and 2. The messages may be forwarded to different SCCP modules and processed with different delays. The SCCP messages may be returned to the inbound LIM in the order 2, 1. When the SCCP message with the sequence number 2 arrives at the inbound LIM, the next expected sequence number counter will be 1. If the SCCP message with the sequence number 2 is transmitted due to expiration of the timer before the SCCP with the sequence number 1 arrives at the inbound LIM, the next expected sequence number is preferably set to 1 more than the sequence number of the transmitted message, namely 3. When the SCCP message assigned sequence number 3 arrives, the message can be sent without delay and the next expected sequence number is set to 4. When the SCCP message with the sequence number 1 arrives at the inbound LIM, it will be determined to be behind the current sequence order and transmitted. The next expected sequence number will be synchronized for all properly sequenced SCCP messages that subsequently arrive at the inbound LIM.

Thus, as described above, the subject matter disclosed herein includes methods and systems for load sharing and preserving sequencing of class 1 SCCP messages. According to the method, class 1 SCCP messages are received at a LIM of an STP and assigned a sequence number. Each class 1 SCCP message is then transmitted to any one of a plurality of SCCP modules for SCCP processing using a load sharing algorithm. After processing, the SCCP messages and returned to the originating LIM and the SCCP ordered based on the assigned sequence numbers for ordered transmission to an outbound LIM. As a result, the SCCP messages can be sequentially received at the STP, load shared, and routed from the STP in the sequence in which the messages were received.

In addition, timestamps are assigned to the messages when they are returned to the originating LIM and queued. If a message at the head of the queue does not have the next expected sequence number for outbound transmission, the message may be sent at the end of a predetermined time period calculated based on the timestamp. As a result, head of queue blocking is prevented.

Although the examples above relate to load sharing and preserving sequencing of class 1 SCCP messages at an STP, the present invention is not limited to performing these functions at an STP. For example, in alternate implementations, the methods and systems described herein may be implemented at a service control point (SCP), a media gateway controller, or any other node or nodes with a distributed processing architecture that receives and processes class 1 SCCP messages. In yet another alternate implementation, the inbound and outbound interface modules may be implemented on an STP and the SCCP modules may be implemented on one or more database nodes separate from the STP.

It will be understood that various details of the subject matter disclosed herein may be changed without departing from the scope of the disclosed subject matter. Furthermore, the foregoing description is for the purpose of illustration only, and not for the purpose of limitation, as the subject matter disclosed herein is defined by the claims as set forth hereinafter.

What is claimed is:

1. A method for load sharing and preserving sequencing of class 1 signaling connection control part (SCCP) messages, the method comprising:
at a communications network routing node:
  (a) receiving a first class 1 SCCP message of a plurality of class 1 SCCP messages relating to a transaction at an inbound interface module in a communications network routing node;
  (b) assigning a sequence number to the first message;
  (c) transmitting at least a portion of the first message from the inbound interface module to any one of a plurality of SCCP modules for SCCP processing, where each of the SCCP modules is selected using a load sharing algorithm and where the load sharing algorithm can select different SCCP modules for different class 1 SCCP messages of the plurality of class 1 SCCP messages relating to the same transaction;
  (d) performing SCCP processing at the SCCP module selected for the first message and returning the at least a portion of the first message to the inbound interface module; and
  (e) at the inbound interface module, ordering the first message with respect to at least one other SCCP message of the plurality of class 1 SCCP messages relating to the same transaction based on the sequence number and transmitting the SCCP message to an outbound interface in the communications network routing node such that class 1 SCCP messages that are sequentially received at the communications network routing node are load shared, and routed from the communications network routing node in the sequence in which the messages were received, wherein the ordering is performed after SCCP messages have been processed at different SCCP modules in the communications network routing node.

2. The method of claim 1 wherein receiving a first class 1 SCCP message at an inbound interface includes receiving the message at a signaling system number 7 (SS7) link interface module.

3. The method of claim 1 wherein receiving a first class 1 SCCP message at an inbound interface module includes receiving a class 1 SCCP message sent over an Internet protocol link at a data communications module.

4. The method of claim 1 wherein assigning a sequence number to the first message includes assigning a per link sequence number to the first message.

5. The method of claim 1 wherein transmitting the first message from the inbound interface module to any of a plurality of SCCP modules for SCCP processing using a load sharing algorithm includes selecting an SCCP module from SCCP modules that have available processing capacity.

6. The method of claim 1 wherein performing SCCP processing includes performing global title translation.

7. The method of claim 1 comprising transmitting the SCCP messages to the inbound interface module for processing.

8. The method of claim 1 comprising assigning a timestamp to the first message at the inbound interface module.

9. The method of claim 8 wherein transmitting the first message to the outbound interface module includes:
  (a) determining whether the first message has a next expected sequence number;
  (b) in response to determining that the first message has the next expected sequence number, transmitting the first message to the outbound interface module; and (c) in response to determining that the first message does not have the next expected sequence number, delaying transmission of the first message.

10. The method of claim 9 comprising receiving a second class 1 SCCP message of the plurality of class 1 SCCP messages relating to the same transaction at the inbound interface module after returning the at least a portion of the first message to the inbound interface module, the second message having the next expected sequence number, and wherein step (c) includes ordering the second message ahead of the first message and transmitting the second message to the outbound interface module before transmitting the first message.

11. The method of claim 9 wherein delaying transmission of the first message includes delaying transmission of the first message until a predetermined time period expires.

12. The method of claim 1 wherein the communications network routing node comprises a signal transfer point (STP).

13. The method of claim 12 wherein the SCCP modules are components of the STP.

14. The method of claim 12 wherein the SCCP modules are components of a database node separate from the STP.

15. The method of claim 1 wherein the interface modules and the SCCP modules are components of a service control point (SCP).

16. The method of claim 1 wherein the interface modules and the SCCP modules are components of a media gateway controller (MGC).

17. A system for load sharing and preserving sequencing of class 1 signal connection control part (SCCP) messages, the system comprising:
(a) an inbound interface module in a communications network routing node for receiving a class 1 SCCP message of a plurality of class 1 SCCP messages relating to a transaction;
(b) a message sequencing function operatively associated with the inbound interface module for assigning a sequence number to the message;
(c) a plurality of SCCP modules for receiving and processing SCCP messages, wherein the inbound interface module forwards at least a portion the message to one of the SCCP modules using a load sharing algorithm to select the one SCCP module, wherein each of the SCCP modules is selected using a load sharing algorithm and where the load sharing algorithm can select different SCCP modules for different class 1 SCCP messages of the plurality of class 1 SCCP messages relating to the same transaction and wherein the SCCP module selected for the class 1 SCCP message performs SCCP processing for the at least a portion of message and return the at least a portion of message to the inbound interface module; and
(d) an ordering and forwarding function for ordering the class 1 SCCP message relative to at least one other SCCP message of the plurality of class 1 SCCP messages relating to the same transaction based on the sequence number assigned to the message and for forwarding the class 1 SCCP message to an outbound interface module in the communications network routing node such that class 1 SCCP messages that are sequentially received at the communications network routing node are load shared, and routed from the communications network routing node in the sequence in which the messages were received, wherein the ordering is performed after SCCP messages have been processed at different SCCP modules in the communications network routing node.

18. The system of claim 17 wherein the inbound interface module comprises a signaling system number 7 (SS7) link interface module.

19. The system of claim 18 wherein the link interface module comprises a low speed link interface module for receiving SS7 messages transmitted over digital signal 0(DS0) signaling links.

20. The system of claim 18 wherein the link interface module comprises a high speed link interface module for receiving SS7 messages transmitted over asynchronous transfer mode (ATM) signaling links.

21. The system of claim 17 wherein the inbound interface module comprises a data communications module (DCM) for receiving SS7 messages transmitted over internet protocol (IP) signaling links.

22. The system of claim 17 wherein the ordering and forwarding function assigns a timestamp to the class 1 SCCP message.

23. The system of claim 22 wherein the ordering and forwarding function delays transmission of the class 1 SCCP message in response to determining that the class 1 SCCP message does not have a next expected sequence number.

24. The system of claim 23 wherein the ordering and forwarding function re-orders the class 1 SCCP message in response to receiving an SCCP message of the plurality of class 1 SCCP messages relating to the same transaction having the next expected sequence number.

25. The system of claim 24 comprising a timer function operatively associated with the ordering and forwarding function for transmitting the class 1 SCCP message that does not have the next expected sequence number in response to failing to receive the class 1 SCCP message having the next expected sequence number within a predetermined time period.

26. A computer program product comprising computer-executable instructions embodied in a computer-readable medium for performing steps comprising:
(a) receiving a first class 1 SCCP message of a plurality of class 1 SCCP messages relating to a transaction at an inbound interface module in a communications network routing node;
(b) assigning a sequence number to the first message;
(c) transmitting at least a portion of the first message from the inbound interface module to any one of a plurality of SCCP modules for SCCP processing, where each of the SCCP modules is selected using a load sharing algorithm and where the load sharing algorithm can select different SCCP modules for different class 1 SCCP messages of the plurality of class 1 SCCP messages relating to the same transaction;
(d) performing SCCP processing at the SCCP module selected for the first message and returning the at least a portion of the first message to the inbound interface module; and
(e) at the inbound interface module, receiving the at least a portion of the first message from the SCCP processing module and ordering the first message with respect to at least one other SCCP message of the plurality of class 1 SCCP messages relating to the same transaction based on the sequence number and the SCCP message to an outbound interface module in the communications network routing node such that class 1 SCCP messages that are sequentially received at the communications network routing node are load shared, and routed from the communications network routing node in the sequence in which the messages were received, wherein the ordering is performed after SCCP messages have been processed at different SCCP modules in the communications network routing node.

27. The computer program product of claim 26 wherein receiving a first class 1 SCCP message of a plurality of class 1 SCCP messages relating to a transaction at an inbound interface includes receiving the message at a signaling system number 7 (SS7) link interface module.

28. The computer program product of claim 26 wherein receiving a first class 1 SCCP message of a plurality of class 1 SCCP messages relating to a transaction at an inbound interface module includes receiving a class 1 SCCP message sent over an Internet protocol link at a data communications module.

29. The computer program product of claim 26 wherein assigning a sequence number to the first message includes assigning a per link sequence number to the first message.

30. The computer program product of claim 26 wherein transmitting the first message from the inbound interface module to any of a plurality of SCCP modules for SCCP processing using a load sharing algorithm includes selecting an SCCP module from SCCP modules that have available processing capacity.

31. The computer program product of claim 26 comprising assigning a timestamp to the first message at the inbound interface module.

32. The computer program product of claim 31 wherein transmitting the first message to the outbound interface module includes:
 (a) determining whether the first message has a next expected sequence number;
 (b) in response to determining that the first message has the next expected sequence number, transmitting the first message to the outbound interface module; and
 (c) in response to determining that the first message does not have the next expected sequence number, delaying transmission of the first message.

33. The computer program product of claim 32 comprising receiving a second class 1 SCCP message of the plurality of class 1 SCCP messages relating to the same transaction at the inbound interface module after returning the at least a portion of the first message to the inbound interface module, the second message having the next expected sequence number, and wherein step (c) includes ordering the second message ahead of the first message and transmitting the second message to the outbound interface module before transmitting the first message.

34. The computer program product of claim 32 wherein delaying transmission of the first message includes delaying transmission of the first message until a predetermined time period expires.

* * * * *